(12) United States Patent
Harvey et al.

(10) Patent No.: US 12,420,456 B2
(45) Date of Patent: Sep. 23, 2025

(54) MOLDS FOR MANUFACTURING TEXTURED ARTICLES, METHODS OF MANUFACTURING THEREOF AND ARTICLES MANUFACTURED THEREFROM

(71) Applicant: Sharklet Technologies, Inc., Aurora, CO (US)

(72) Inventors: Eric Van Harvey, Centennial, CO (US); Ryan Eugene Stoneberg, Aurora, CO (US)

(73) Assignee: SHARKLET TECHNOLOGIES, INC., Aurora, CO (US)

( * ) Notice: Subject to any disclaimer, the term of this patent is extended or adjusted under 35 U.S.C. 154(b) by 62 days.

(21) Appl. No.: 18/366,530

(22) Filed: Aug. 7, 2023

(65) Prior Publication Data
US 2023/0382018 A1  Nov. 30, 2023

Related U.S. Application Data

(63) Continuation-in-part of application No. 16/356,332, filed on Mar. 18, 2019, now Pat. No. 11,717,991.

(60) Provisional application No. 62/645,270, filed on Mar. 20, 2018.

(51) Int. Cl.
| | |
|---|---|
| B29C 33/38 | (2006.01) |
| B29C 33/42 | (2006.01) |
| B29C 41/14 | (2006.01) |
| B29C 41/38 | (2006.01) |
| B29L 31/48 | (2006.01) |

(52) U.S. Cl.
CPC ........ *B29C 33/3842* (2013.01); *B29C 33/424* (2013.01); *B29C 41/14* (2013.01); *B29C 41/38* (2013.01); *B29L 2031/4864* (2013.01)

(58) Field of Classification Search
None
See application file for complete search history.

(56) References Cited

U.S. PATENT DOCUMENTS

| | | | |
|---|---|---|---|
| 9,845,543 B2 * | 12/2017 | Lee | ........................ B23P 15/24 |
| 10,150,245 B2 | 12/2018 | Chung et al. | |
| 2006/0219143 A1 | 10/2006 | Brennan et al. | |
| 2009/0057947 A1 | 3/2009 | Nemchick et al. | |
| 2010/0119755 A1 | 5/2010 | Chung et al. | |
| 2010/0226943 A1 | 9/2010 | Brennan et al. | |
| 2012/0319325 A1 | 12/2012 | Chung et al. | |
| 2013/0052294 A1 | 2/2013 | Wang et al. | |

(Continued)

*Primary Examiner* — Jacob T Minskey
*Assistant Examiner* — Adrien J Bernard
(74) *Attorney, Agent, or Firm* — CANTOR COLBURN LLP

(57) ABSTRACT

Disclosed herein is a method of forming a mold comprising disposing a film having a textured surface on a support; pressing the film onto the support to cover a surface of the support; disposing a backing on the film; separating the support from the backing; and molding a material in the backing. Disclosed herein too is a method comprising contacting a first mandrel with a first mold; where the first mold has a textured surface; texturing a surface of the first mandrel with the first mold; disposing the first mandrel in a die; disposing a first material in the die to contact the first mandrel; imparting a texture from the surface of the first mandrel onto the material to form a second mold; and disposing a texture from the second mold onto a second material; where the second material is different from the first material.

21 Claims, 6 Drawing Sheets

(56) References Cited

U.S. PATENT DOCUMENTS

| | | |
|---|---|---|
| 2015/0028325 A1 | 1/2015 | Seki et al. |
| 2015/0342725 A1 | 12/2015 | Cuevas et al. |
| 2016/0123846 A1 | 5/2016 | Magin et al. |
| 2017/0152338 A1 | 6/2017 | Brennan et al. |
| 2017/0216543 A1 | 8/2017 | Magin et al. |
| 2018/0078423 A1 | 3/2018 | Magin et al. |
| 2018/0171157 A1 | 6/2018 | Magin et al. |
| 2018/0214600 A1 | 8/2018 | Magin et al. |
| 2019/0112185 A1* | 4/2019 | Mantyoja ............... B81B 7/0048 |
| 2019/0112186 A1 | 4/2019 | Jang et al. |
| 2019/0161627 A1 | 5/2019 | Brennan et al. |
| 2019/0202109 A1 | 7/2019 | Stoneberg et al. |
| 2019/0224903 A1 | 7/2019 | Thielman et al. |
| 2020/0078160 A1 | 3/2020 | Magin et al. |

\* cited by examiner

MOLDS FOR MANUFACTURING TEXTURED ARTICLES, METHODS OF MANUFACTURING THEREOF AND ARTICLES MANUFACTURED THEREFROM

CROSS-REFERENCE TO RELATED APPLICATION

This Non-Provisional application claims the benefit of and is a continuation-in-part application of U.S. patent application Ser. No. 16/356,332, filed on Mar. 18, 2019, which is a non-provisional patent application of U.S. Provisional Application No. 62/645,270 filed on Mar. 20, 2018, the entire contents of which are hereby incorporated by reference.

BACKGROUND

Disclosed herein are molds for manufacturing textured articles, methods of manufacturing the molds and articles manufactured from the molds.

Textured surfaces having micrometer and nanometer sized texturing are used for a variety of different applications such as, for example, adhesion control, bioadhesion control, flow control, abrasion resistance, controlling mechanical properties of the article, controlling electrical and magnetic properties of the article, and the like. Manufacturing such textured surfaces is difficult at high production rates because of the intricate patterns that need to be transferred from molds to the articles. It is therefore desirable to develop methods by which articles having such textured surfaces can be manufactured.

SUMMARY

Disclosed herein is a method of forming a mold comprising disposing a film having a textured surface on a support; where the support has a shape of an article to be manufactured; pressing the film onto the support to cover a surface of the support; disposing a backing on the film; separating the support from the backing; and molding a material in the backing.

Disclosed herein too is a method comprising contacting a first mandrel with a first mold; where the first mold has a textured surface; texturing a surface of the first mandrel with the first mold; disposing the first mandrel in a die; disposing a first material in the die to contact the first mandrel; imparting a texture from the surface of the first mandrel onto the material to form a second mold; and disposing a texture from the second mold onto a second material; where the second material is different from the first material.

DETAILED DESCRIPTION

Disclosed herein is a method of manufacturing a mold that can be used for manufacturing articles having textured surfaces where the textured surface may be a regular surface (one that obeys the laws of Euclidean geometry), an irregular surface (one that varies from the laws of Euclidean geometry) or the combination thereof. In an embodiment, the surface of the article may convoluted—i.e., has a variety of asymmetrical curved surfaces.

The method comprises manufacturing a film that has two opposing surfaces at least one of which is textured, disposing the film on a mandrel, vacuuming forming the film on the mandrel, electroforming a metal on the film to develop an image of the textured film surface, dissolving the mandrel and using the electroformed metal as a mold to manufacture articles having the textured surface disposed thereon.

In one embodiment, the method encompasses a molding technique for replicating a texture (i.e., a pattern) onto a curved surface of an article that is to be mass produced. In one embodiment, the pattern generally has some features that are of the order of a few nanometers to several hundreds of millimeters in size. In another embodiment, the pattern is disposed on an outer surface and/or an inner surface of a device. The inner and outer surfaces can be curved, planar, or a combination of a curved and planar surface.

Figure 1:
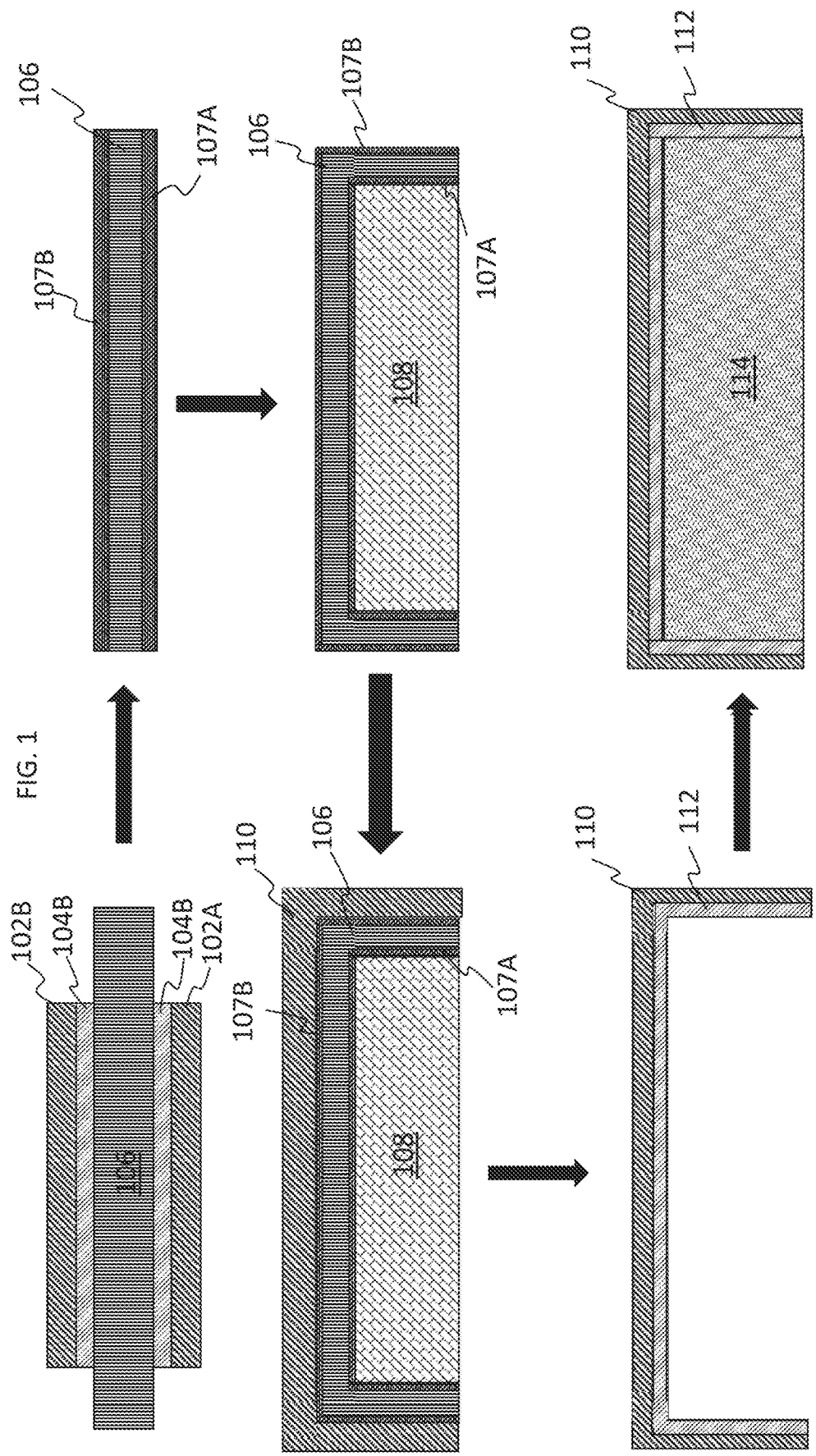
FIG. 1 is a depiction of a method that is used to manufacture articles having a textured surface.

With reference now to the FIG. 1, a mold having opposed clamps 102A and 102B, where each clamp has respective textured surfaces 104A and 104B that contact a film 106 of a moldable material. The clamps 102A, 102B with their respective textured surfaces 104A, 104B can be rigid or flexible. An image of the texture 107A, 107B is formed on the film 106 surfaces during the contact. The film 106 is then affixed to a support 108. In an embodiment, the affixing of the film 106 to the support 108 is conducted by vacuum forming. The support 108 with the film 106 disposed thereon is then placed in an electrolytic bath or in a vapor deposition chamber to form a backing 110 on the film 106 surface. The backing 110 is then separated from the film 106 and the support 108 or alternatively, separated from just the support 108, and may be used as an independent mold to manufacture large numbers articles 114 having the textured surface. In other words, either the backing 110 or the film 106 may be used to manufacture an article 114 having the textured surface.

In an embodiment, the textured surfaces 104A and 104B may comprise any metal, ceramic, polymer, or combination thereof, that can be textured and that can withstand the temperatures and pressures used to transfer an image of a texture to a material that is used to form the film 106. In an embodiment, the textured surfaces 104A and 104B can comprise a metal such as, for example, a nickel shim. In another embodiment, the textured surfaces 104A and 104B, can comprise a polymer, such as, for example, a polysiloxane. In yet another embodiment, the textured surface 104A can comprise a metal shim, while the textured surface 104B can comprise a polymeric film. In an embodiment, the textured surface 104A can have the same texture or a different texture from the textured surface 104B. The textures will be detailed later in this document.

The film 106 may comprise any metal, ceramic, polymer, or combination thereof. In an embodiment, the film 106 comprises a polymer that can be molded between the textured surfaces 104A and 104B. The polymer is preferably one that can be cast in the form of either a molten liquid or a liquid solution and that can undergo solidification in the mold while being imprinted with the texture during its contact with the surfaces 104A and 104B.

As noted above, the clamps 102A, 102B with their textured surfaces 104A, 104B can be rigid or flexible. In an embodiment, a polymer may be disposed between respective textured surfaces 104A, 104B of the clamps 102A, 102B and the entire assembly may be subjected to compression in a roll mill to form the film 106 with its textured opposing surfaces. The film may be subjected to heating and curing during the rolling operation.

The polymers used in the film may be selected from a wide variety of thermoplastic polymers, blend of thermoplastic polymers, thermosetting polymers (also known as cured or curable polymers), or blends of thermoplastic polymers with thermosetting polymers. The polymer may also be a blend of polymers, copolymers, terpolymers, or combinations comprising at least one of the foregoing organic polymers. The polymer can also be an oligomer, a homopolymer, a copolymer, a block copolymer, an alternating block copolymer, a random polymer, a random copolymer, a random block copolymer, a graft copolymer, a star block copolymer, a dendrimer, a polyelectrolyte (polymers that have some repeat groups that contain electrolytes), a polyampholyte (a polyelectrolyte having both cationic and anionic repeat groups), an ionomer, or the like, or a combination comprising at last one of the foregoing polymers. The polymers have number average molecular weights greater than 10,000 grams per mole, preferably greater than 20,000 g/mole and more preferably greater than 50,000 g/mole.

Examples of thermoplastic polymers include polyacetals, polyacrylics, polycarbonates, polyalkyds, polystyrenes, polyolefins, polyesters, polyamides, polyaramides, polyamideimides, polyarylates, polyurethanes, epoxies, phenolics, silicones, polyarylsulfones, polyethersulfones, polyphenylene sulfides, polysulfones, polyimides, polyetherimides, polytetrafluoroethylenes, polyetherketones, polyether ether ketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polypropylenes, polyethylenes, polyethylene terephthalates, polyvinylidene fluorides, polysiloxanes, or the like, or a combination comprising thereof.

Examples of polyelectrolytes include polystyrene sulfonic acid, polyacrylic acid, pectin, carrageenan, alginates, carboxymethylcellulose, polyvinylpyrrolidone, or the like, or a combination thereof.

Examples of thermosetting polymers include epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, diallyl phthalate, triallyl cyanurate, triallyl isocyanurate, unsaturated polyesterimides, or the like, or a combination thereof.

In an embodiment, the film 106 may comprise an elastomer. Examples of elastomers include polybutadienes, polyisoprenes, styrene-butadiene rubber, poly(styrene)-block-poly(butadiene), poly(acrylonitrile)-block-poly(styrene)-block-poly(butadiene) (ABS), polychloroprenes, epichlorohydrin rubber, polyacrylic rubber, silicone elastomers (polysiloxanes), fluorosilicone elastomers, fluoroelastomers, perfluoroelastomers, polyether block amides (PEBA), chlorosulfonated polyethylene, ethylene propylene diene rubber (EPR), ethylene-vinyl acetate elastomers, or the like, or a combination thereof.

In a preferred embodiment, the film 106 comprises a curable polysiloxane, a curable acrylate, a curable epoxy, or a combination thereof.

Suitable curable polysiloxanes (hereinafter polysiloxanes) are represented by the structure of Formula (1) below:

$$R^B\text{—[O—[Si}(R^A)_2]_n\text{—}R^B \quad (1)$$

wherein n is an integer from 1 to 10,000, or from 2,000 to 8,000, or from 5,000 to 7,000; each $R^A$ is independently hydrogen, or an alkyl group having from 1 to 6 carbon atoms, or an alkyl group having from 1 to 3 carbon atoms; and each $R^B$ is independently hydrogen, an epoxy group, an ethylenically unsaturated group, a thiol group, an alkoxy group, a vinyl group, or the like. In an embodiment, $R^A$ is independently —H, or —$C_xH_{2x+1}$, wherein each x is independently 1 to 6, or independently 1 to 3. In an embodiment, each $R^A$ is —$CH_3$. It is desirable for $R^A$ to not be an aromatic group.

The polysiloxane can be a room temperature vulcanizate (RTV) silicone, including a two-component RTV curing system including a silicone rubber compound and curing agent. The polysiloxane can be RTV615. The polysiloxane can remain flexible at temperatures of −115 to 204° C. The silicone polymer can have a viscosity prior to curing between 3,000 and 7,000 centipoise (cps) at 23° C., preferably between 3,500 and 4,500 cps at 23° C.

Useful curable acrylates (hereinafter acrylates) for use in the film 106 are those represented by Formula (2):

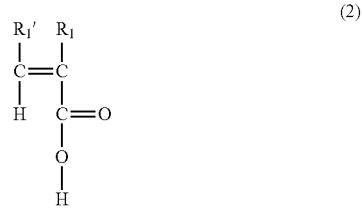

where $R_1$ is a hydrogen, an alkyl group having 1 to 10 carbon atoms, a fluoroalkyl group having 1 to 10 carbon atoms and where $R_1'$ is hydrogen, a five membered ring or a six membered ring having at least one heteroatom, where the heteroatom is oxygen, nitrogen, sulfur, or phosphorus; or a monomer represented by Formula (3):

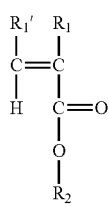

(3)

where $R_1$ is a hydrogen, an alkyl group having 1 to 10 carbon atoms, or a fluoroalkyl group having 1 to 10 carbon atoms; where $R_1'$ is hydrogen, a five membered ring or a six membered ring having at least one heteroatom, where the heteroatom is oxygen, nitrogen, sulfur, or phosphorus; and where $R_2$ is a $C_{1-30}$ alkyl, $C_{3-30}$ cycloalkyl, $C_{6-30}$ aryl, $C_{7-30}$ alkaryl, $C_{7-30}$ aralkyl, $C_{1-30}$ heteroalkyl, $C_{3-30}$ heterocycloalkyl, $C_{6-30}$ heteroaryl, $C_{7-30}$ heteroalkaryl, $C_{7-30}$ heteroaralkyl, a $C_{2-10}$ fluoroalkyl group, an alkylene oxide, or a combination comprising at least one of the foregoing groups.

In another embodiment, the acrylate is a monomer represented by Formula (4):

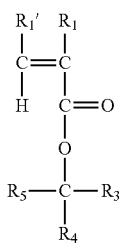

(4)

where $R_1$ is a hydrogen, an alkyl group having 1 to 10 carbon atoms, or a fluoroalkyl group having 1 to 10 carbon atoms; where $R_1'$ is hydrogen, a five membered ring or a six membered ring having at least one heteroatom, where the heteroatom is oxygen, nitrogen, sulfur, or phosphorus; where at least one of $R_3$, $R_4$ and $R_5$ is a $C_{1-30}$ alkyl, $C_{3-30}$ cycloalkyl, $C_{6-30}$ aryl, $C_{7-30}$ alkaryl, $C_{7-30}$ aralkyl, $C_{1-30}$ heteroalkyl, $C_{3-30}$ heterocycloalkyl, $C_{6-30}$ heteroaryl, $C_{7-30}$ heteroalkaryl, $C_{7-30}$ heteroaralkyl, a $C_{2-30}$ fluoroalkyl group, an alkylene oxide, or a combination comprising at least one of the foregoing groups, where each of the groups is covalently bonded to one or more vinyl groups.

The curable epoxy (hereinafter aromatic epoxy) may be an aromatic, aliphatic or cycloaliphatic epoxy. In an embodiment, a useful epoxy is the diglycidyl ether of bisphenol F, also known as Epon 862® and having the structure shown in Formula (5):

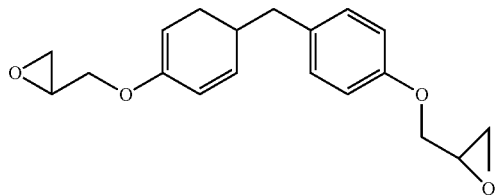

(5)

In another embodiment, the epoxy is a modified diglycidyl ether of bisphenol F also known as a modified EPON 862® and having the structure shown in Formula (6):

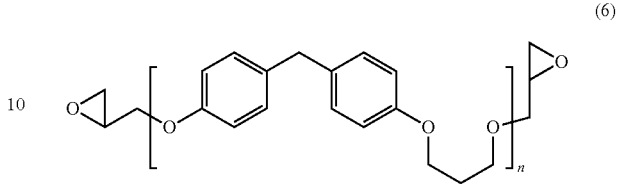

(6)

where n is the number of repeat units. The epoxy of the formula (6) is produced by polymerizing bisphenol F with the EPON 862.

In an embodiment, the epoxy may have the structure shown in the Formula (7) below:

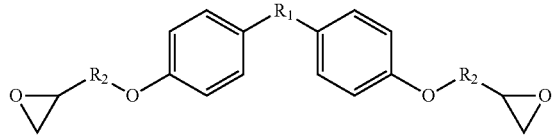

(7)

where $R_1$ is a single bond, —O—, —S—, —C(O)—, or a $C_{1-18}$ organic group. The $C_{1-18}$ organic bridging group may be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In the Formula (6), $R_2$ is a $C_{1-30}$ alkyl group, a $C_{3-30}$ cycloalkyl, a $C_{6-30}$ aryl, a $C_{7-30}$ alkaryl, a $C_{7-30}$ aralkyl, a $C_{1-30}$ heteroalkyl, a $C_{3-30}$ heterocycloalkyl, a $C_{6-30}$ heteroaryl, a $C_{7-30}$ heteroalkaryl, a $C_{7-30}$ heteroaralkyl, a $C_{2-30}$ fluoroalkyl group, or a combination thereof.

In yet another exemplary embodiment, the epoxy is the reaction product of 2-(chloromethyl)oxirane and 4-[2-(4-hydroxyphenyl)propan-2-yl]phenol also known as bisphenol A-epichlorohydrin based epoxy (also known as bisphenol A diglycidyl ether) of the Formula (8) below:

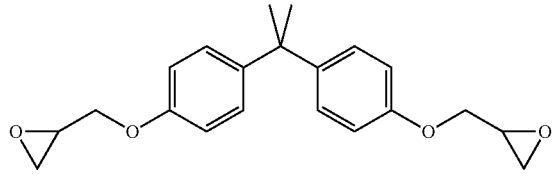

(8)

The epoxy of Formula (8) is commercially available as EPON 828. Other exemplary variations of Formula (7) that may be used are shown in the Formulas (9) and (10). In an embodiment, one variation of the Formula (6) that may be used is shown in the Formula (9) below.

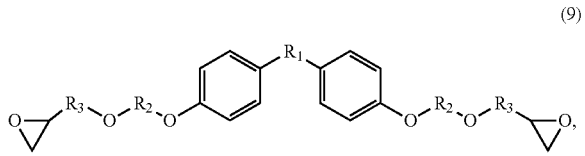

(9)

where $R_1$ is detailed above in Formula (7), $R_2$ and $R_3$ may be the same or different and are independently a $C_{1-30}$ alkyl group, a $C_{3-30}$ cycloalkyl, a $C_{6-30}$ aryl, a $C_{7-30}$ alkaryl, a $C_{7-30}$ aralkyl, a $C_{1-30}$ heteroalkyl, a $C_{3-30}$ heterocycloalkyl, a $C_{6-30}$ heteroaryl, a $C_{7-30}$ heteroalkaryl, a $C_{7-30}$ heteroaralkyl, a $C_{2-30}$ fluoroalkyl group, or a combination thereof.

In an exemplary embodiment, an epoxy having the structure of Formula (10) may be used in the composition.

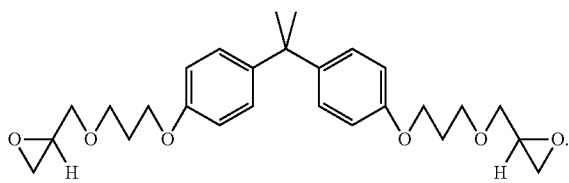 [SMILES: CC(C)(c1ccc(OCCCOCC2CO2)cc1)c1ccc(OCCCOCC2CO2)cc1]

Examples of suitable epoxies are diglycidyl ether of bisphenol A, diomethane diglycidyl ether, 2,2-bis(4-glycidyloxyphenyl)propane, 2,2'-((1-methylethylidene)bis(4,1-phenyleneoxymethylene))bisoxirane, 2,2-bis(4-(2,3-epoxypropyloxy)phenyl)propane, 2,2-bis(4-hydroxyphenyl)propane, diglycidyl ether, 2,2-bis(p-glycidyloxyphenyl)propane, 4,4'-bis(2,3-epoxypropoxy)diphenyldimethylmethane, 4,4'-dihydroxydiphenyldimethylmethane diglycidyl ether, 4,4'-isopropylidenebis(1-(2,3-epoxypropoxy)benzene), 4,4'-isopropylidenediphenol diglycidyl ether, bis(4-glycidyloxyphenyl)dimethylmethane, bis(4-hydroxyphenyl)dimethylmethane diglycidyl ether, diglycidyl ether of bisphenol F, 2-(butoxymethyl)oxirane, the reaction product of 2-(chloromethyl)oxirane and 4-[2-(4-hydroxyphenyl)propan-2-yl]phenol also known as bisphenol A-epichlorohydrin based epoxy, modified bisphenol A-epichlorohydrin based epoxy, diglycidyl 1,2-cyclohexanedicarboxylate, 1,4-cyclohexanedimethanol diglycidyl ether, a mixture of cis and trans 1,4-cyclohexanedimethanol diglycidyl ether, neopentyl glycol diglycidyl ether, resorcinol diglycidyl ether, 4,4'-methylenebis(N,N-diglycidylaniline), 3,4-epoxycyclohexylmethyl 3,4-epoxycyclohexanecarboxylate, 3,4-epoxy-1-cyclohexanecarboxylic acid, 3,4-epoxycyclohexan-1-yl) methyl ester, tert-butyl glycidyl ether, 2-Ethylhexyl glycidyl ether, epoxypropoxypropyl terminated polydimethylsiloxanes, neopentyl glycol diglycidyl ether, 1,4-cyclohexanedimethanol diglycidyl ether, 1,3-bis[2-(3,4-epoxycyclohexyl)ethyl]tetramethyldisiloxane, trimethylolpropane triglycidyl ether, diglycidyl 1,2-cyclohexanedicarboxylate, or the like, or a combination comprising at least one of the foregoing epoxies.

Polysiloxanes are preferred for manufacturing the film 106. Polysiloxanes can be poured into the mold 102A, 102B and can be cured at elevated temperatures to form a solid film 106 that can withstand temperatures of greater than 275° C., preferably greater than 300° C. During the curing, the texture 104A and 104B is transferred to the film 106 where it is shown as 107A and 107B on opposing faces of the film 106.

As seen in the FIG. 1, the solid film 106 bearing the texture is disposed on a support 108. The support 108 may have the desired shape of the article 114 that is to be reproduced during manufacturing. Of the two textured surfaces 107A and 107B, the texture that is not desired on the article 114 surface may be used to contact the article support 108. The other surface is positioned such that it will contact the backing 110 when it is formed.

The support 108 is also called a mandrel. The support generally has the shape of the article to be formed. The support 108 may comprise curved or planar surfaces of the. The curved surfaces may comprise an inner and/or outer surfaces of a sphere, a hemisphere, a cylinder, a tube, a cone, or the like. Examples of planar surfaces are the plane inner and/or outer surfaces of pyramids, cubes, polygons, or the like.

The support 108 may comprise may comprise a metal, a ceramic, an organic polymer, or a combination comprising at least one metal, ceramic or organic polymer. In an aspect, the support may comprise a ceramic, ABS, nylon, or a combination thereof.

The film 106 is subjected to vacuum forming, thermoforming, or a combination thereof, to take the shape of the support without any folds or air bubbles disposed therebetween. In short, the film is disposed on the support 108 and is subjected to a temperature and a reduced pressure to take a shape of the support 108. Vacuum forming is preferred.

An effective temperature for performing the vacuum forming is 100 to 400° C. An effective pressure for performing the vacuum forming is 50 to 3800 torr (i.e., 5 standard atmospheric pressure, atm), for example, 100 to 3800 torr, 760 to 3800 torr, or 760 to 2000 torr.

The support 108 together with the film 106 vacuum formed thereon is then disposed a) in an electrolytic bath to form the backing 110 on the film 106 surface or b) in a chemical vapor deposition chamber the backing 110 on the film 106 surface. The backing 110 formed on the film 106 surface comprises a metal, a polymer or a ceramic. The backing 110 formed on the film 106 surface is preferably a metal.

Examples of metals that may be used to form the backing 110 are nickel, zinc, tin, gold, platinum, silver, aluminum, titanium, iron, nickel bromide, or alloys thereof. In an embodiment, nickel is a preferred metal for use in the backing 110.

Suitable salts for depositing a nickel backing (via an electrolytic) can include nickel sulfate, nickel sulfamate, nickel chloride, nickel ammonium sulfate, or a combination thereof. Additives to the electrolytic bath can include zinc salts such as zinc sulfate, ammonium salts such as ammonium chloride, boric acid, salts of boron, or a combination thereof.

The backing 110 may have a thickness of 0.025 to 50 millimeters. The surface of the backing 110 that contacts the film 106 derives a texture from the surface 107B. In short, the surface 112 of the backing 110 contains a texture that is an opposing image of the texture on surface 107B.

Following the deposition, the support 108 with the film 106 and the backing 110 disposed thereon may be optionally washed to remove traces of impurities. Following drying, the support 108 with the film 106 and the backing 110 disposed thereon is subjected to a process where the support 108 and/or the film 106 is/are removed. In an embodiment, the support 108 may be removed by chemical etching, degradation or melting using electromagnetic radiation, ion beam etching, mechanical degradation, thermal degradation or melting, or a combination thereof. In another embodiment, the film 106 may also be removed using chemical etching, degradation or melting using electromagnetic radiation, ion beam etching, mechanical degradation, thermal degradation or melting, or a combination thereof.

The backing 110 having a textured surface 112 may be used as a new mold to form replicas having the surface structure of the film 106. In an embodiment, the textured surface 112 is a replica of the 104B of the mold 102B. The backing 110 may then be disposed on a new support to provide it with mechanical support and integrity, or alternatively, the backing 110 may be disposed in the clamps of a mold, where it can be used to mold new materials.

In an embodiment, depicted in the FIG. 1, the backing 110 may be filled with a resin 114 to form an article that has a textured surface imparted to it by the textured surface 112 of the backing 110. The resin 114 may be a molten resin or a resin blended with a solvent. After the backing 110 is filled with the molten resin, it is allowed to cool down to form a solid article with a textured surface. Alternatively, if the resin is mixed with a solvent, it may be subjected to a vacuum to remove any volatiles. The backing 110 is then removed from the molded article and reused.

The backing 110 may thus be use to reproduce the texture on a plurality of different materials. It may also be used to mass produce articles for commercial use.

With reference now to the FIG. 1, the clamps 102A, 102B have textured surfaces 104A, 104B. The surface texture 104A, 104B can comprise a plurality of patterns. In one embodiment, the pattern generally has some features that are of the order of a few nanometers to several hundreds of millimeters in size. Each pattern is defined by a plurality of spaced apart features attached to or projected into the surface of the clamps 102A, 102B. The plurality of features on the surface each has at least one neighboring feature that has a substantially different geometry or a substantially different size. The average spacing between adjacent features on the surface texture 104A, 104B is between about 1 nanometer to about 1 millimeter in at least a portion of the surface. The surface may be planar, curved, or include portions that are planar combined with other portions that are curved.

In one embodiment, when the surface texture is viewed in a first direction, the plurality of spaced apart features is represented by a periodic function. In another embodiment, the plurality of spaced apart features forms a pattern. Each pattern is separated from a neighboring pattern by a pathway that has a periodicity to it. The periodicity of this pathway may be sinusoidal. Non-limiting examples of the texture present on the surface texture are shown in the FIGS. 2(A), 2(B), 2(C) and 2(D).

In one embodiment, the surface texture 104A, 104B can comprise a pattern that comprises a plurality of spaced features. The spaced features are arranged in a plurality of groupings. The groupings of features comprise repeat units that can be repeated laterally and longitudinally across the surface. The spaced features within a grouping are spaced apart at an average distance of about 1 nanometer to about 500 micrometers, preferably at least 1 nanometer to about 10 micrometers. Each spaced feature has a surface that is substantially parallel to a surface on a neighboring feature. Each feature is separated from a neighboring feature and the groupings of features are arranged with respect to one another so as to define a tortuous pathway.

In yet another embodiment, the surface texture 104A, 104B comprises a plurality of spaced features. The features are arranged in a plurality of groupings such that the groupings of features comprise repeat units. The spaced features within a grouping are spaced apart at an average distance of about 1 nanometer to about 500 micrometers, preferably about 1 nanometer to about 10 micrometers. The groupings of features are arranged with respect to one another so as to define a tortuous pathway where a tangent to the tortuous pathway intersects with a spaced feature. The spaced feature is different in geometry (shape or size) from each nearest neighbor and is not in contact with the nearest neighbor.

In yet another embodiment, the surface texture 104A, 104B has a topography that comprises a pattern defined by a plurality of spaced apart features attached to or projected into a base surface of the clamps 102A, 102B (see FIG. 1). The plurality of features comprise at least one feature having a substantially different geometry, wherein neighboring patterns share a common feature, the plurality of spaced apart features having at least one dimension that is about 1 nanometer to about 1,000 micrometers. The neighboring spaced apart features can be spaced apart by a distance of about 5 nanometers to about 500 micrometers, specifically about 10 nanometers to about 100 micrometers, specifically about 1 micrometer to about 50 micrometers, and more specifically about 2 micrometers to about 25 micrometers.

In yet another embodiment, the surface texture 104A, 104B comprises a plurality of spaced features; the features being arranged in a plurality of groupings; the groupings of features comprising repeat units; the spaced features within a grouping being spaced apart at an average distance of about 1 nanometer to about 200 millimeters. The groupings of features are arranged with respect to one another so as to define a tortuous path. In one embodiment, a tangent to the tortuous path intersects with at least one of the features.

In one embodiment, when viewed in a second direction, the pathway between the features may be non-linear and non-sinusoidal. In other words, the pathway can be non-linear and aperiodic. In another embodiment, the pathway between the features may be linear but of a varying thickness. The plurality of spaced features may be projected outwards from a surface or projected into the surface. In one embodiment, the plurality of spaced features may have the same chemical composition as the surface. In another embodiment, the plurality of spaced features may have a different chemical composition from the surface.

The tortuous pathway may be represented by a periodic function. The periodic functions may be different for each tortuous pathway. In one embodiment, the patterns can be separated from one another by tortuous pathways that can be represented by two or more periodic functions. The periodic functions may comprise a sinusoidal wave. In an exemplary embodiment, the periodic function may comprise two or more sinusoidal waves.

In another embodiment, when a plurality of different tortuous pathways are represented by a plurality of periodic functions respectively, the respective periodic functions may be separated by a fixed phase difference. In yet another embodiment, when a plurality of different tortuous pathways are represented by a plurality of periodic functions respectively, the respective periodic functions may be separated by a variable phase difference.

In another embodiment, the topography of the surface texture 104A, 104B has an average roughness factor (R) of from 2 to 50.

In one embodiment, each feature of a pattern has at least one neighboring feature that has a different geometry (e.g., size or shape). A feature of a pattern is a single element. Each feature of a pattern has at least 2, 3, 4, 5, or 6 neighboring features that have a different geometry from the feature. In one embodiment, there are at least 2 or more different features that form the pattern. In another embodiment, there are at least 3 or more different features that form the pattern. In yet another embodiment, there are at least 4 or more different features that form the pattern. In yet another embodiment, there are at least 5 or more different features that form the pattern.

In another embodiment, at least two identical features of the pattern have at least one neighboring feature that has a different geometry (e.g., size or shape). A feature of a pattern is a single element. In one embodiment, two identical features of the pattern have at least 2, 3, 4, or 6 neighboring features that have a different geometry from the identical features. In another embodiment, three identical features of the pattern have at least 2, 3, 4, 5, or 6 neighboring features that have a different geometry from the identical features.

In another embodiment, each pattern has at least one or more neighboring patterns that have a different size or shape. In other words, a first pattern can have a second neighboring pattern that while comprising the same features as the first pattern can have a different shape from the first pattern. In yet another embodiment, each pattern has at least two or more neighboring patterns that have a different size or shape. In yet another embodiment, each pattern has at least three or more neighboring patterns that have a different size or shape. In yet another embodiment, each pattern has at least four or more neighboring patterns that have a different size or shape.

The texturing on the surfaces 104A and 104B may be represented by nomenclature. One example of the nomenclature adopted here may be represented by +XSKY×Z and should deciphered as follows: The +X indicates the height of the texture above the base surface of the clamp while the SK refers to a Sharklet pattern depicted and described in U.S. Pat. No. 7,143,709 B2 to Brennan et al., and Patent Application having Ser. No. 12/550,870 to Brennan et al. FIG. 2A in this document represents the Sharklet pattern. The negative sign (−) preceding the X would indicate that the texture is below the base surface. The Y in XKY×Z stands for the width of each feature in the pattern while the second Z stands for the spacing between the features in the pattern.

Figure 2B:
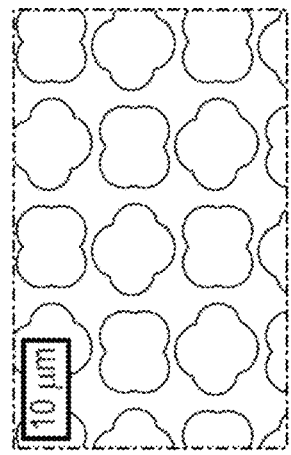
FIG. 2B is a depiction of another of the texture designs.
Figure 2D:
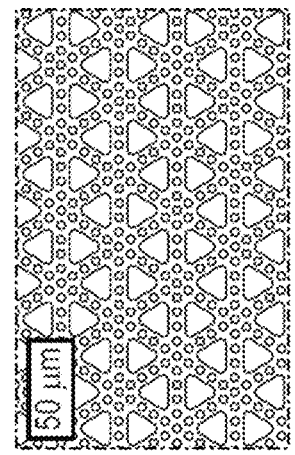
FIG. 2D is a depiction of another of the texture designs.
Figure 2A:
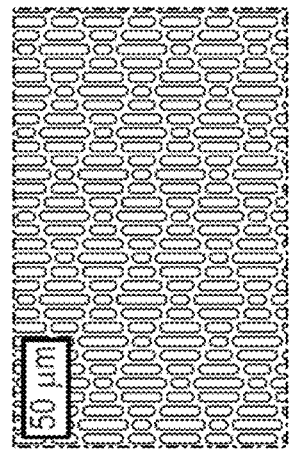
FIG. 2A is a depiction of one of the different texture designs.
Figure 2C:
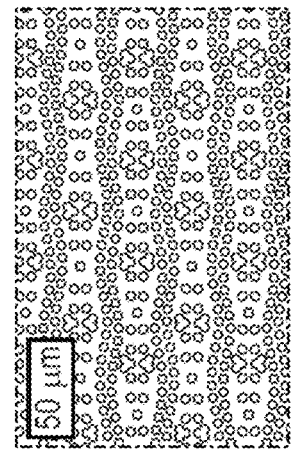
FIG. 2C is a depiction of another of the texture designs.

FIGS. 2B, 2C and 2D are images of other texture designs that may be used to manufacture one of the articles described herein.

The articles manufactured by this method may be used in a wide variety of applications. The articles may find utility in biomedical implants, such as breast plant shells or other fluid filled implant shells; biomedical instruments, such as heart valves; hospital surfaces (e.g., consider film (electrostatic) applications to surfaces that can be readily replaced between surgeries); clothing/protective personal wear; biomedical packaging, such as, for example, the outside surface of sterilized packaging; clean room surfaces, such as, for example, the semiconductor or biomedical industry; food industry, such as, for example, food packaging, food preparation surfaces; marine industry, such as, for example, exterior surfaces of marine vessels including ships and associated bilge tanks, gray water tanks and water inlet/outlet pipes; water treatment plants, such as, for example, pumping stations; power plants; airline industry; furniture industry, such as, for examples, for children's cribs, handles on exercise equipment, and exercise equipment; in the transportation industry, such as, for example, in ambulances, buses, public transit; swimming pools and other structures that are used in aquatic environments; and the like.

Using a Thin Membrane to Texture a Mandrel

In this embodiment, a thin membrane having the aforementioned texture is disposed on a mandrel. The membrane has a thickness of 500 nanometers to 100 micrometers, preferably 1 micrometer to 50 micrometers, and more preferably 5 micrometers to 25 micrometers. The mandrel surface is originally untextured and the membrane is vacuum formed on the mandrel to transfer its texture to the mandrel. The mandrel is usually maintained at a temperature that is effective to permit its surface to deform to accept the texture imparted to it by the membrane. A negative image of the texture present on the membrane is formed on the mandrel.

The membrane is thin enough to conform to the shape of the mandrel but is also flexible enough and tough enough to exert pressure uniformly on all surfaces of the mandrel. Following the imparting of the texture to the mandrel, the mandrel surface may be electroplated with a suitable metal. The mandrel with the metal coating disposed thereon is then used to manufacture one or more molds. The molds now have the texture of the thin membrane and can impart this texture to a variety of different articles.

Figure 3:
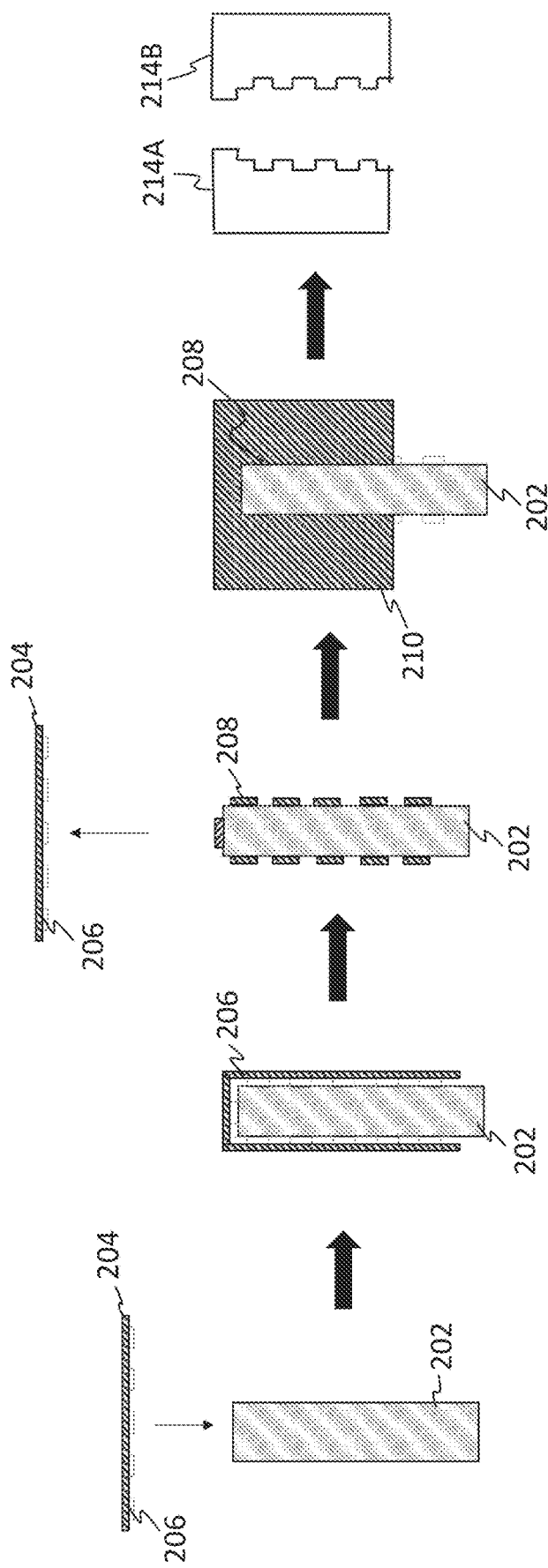
FIG. 3 is a depiction of a process for texturing a material using a membrane.

FIG. 3 depicts one method of manufacturing the textured mandrel. The mandrel 202 is contacted with a membrane 204 having a texture 206 on one of its surfaces. The mandrel may be heated during the contact with the membrane 204. The membrane 204 may be vacuum formed on the mandrel 202. When the membrane 204 is removed from the mandrel 202, an image 208 of the texture 206 is formed on the outside of the mandrel 202. The mandrel 202 may then be placed in a die and a casting material (e.g., a metal, a ceramic or a polymer) disposed on the mandrel to form a mold 210. The mold 214A and 214B is then removed from the mandrel 202 and may be used to manufacture other articles. The articles will have the texture inscribed on the surface.

The articles with the textured surface may have a total thickness of 1 to 50 micrometers, preferably 5 to 40 micrometers, and more preferably 10 to 30 micrometers.

UV Coating Applied to Mold

In this embodiment, a hard curable coating is applied to a mold. A membrane having the aforementioned texture is applied to the hard curable coating. The membrane imparts a negative image of its texture to the coating. The membrane is generally vacuum formed onto the hard curable coating. The curable coating may then be cured using light (UV light, visible light, or the like), heat or a combination of light and heat. The mold with the textured coating may then be used either to mold additional resins to produce articles having the textured surface. The curable coating may comprise any suitable coating material that is curable by e.g., heat, UV radiation, infrared radiation, electron beam radiation, microwave radiation, or a combination thereof. For examples the curable coating comprises acrylic resin, epoxy resin, polyurethane resin, or a combination thereof, but is not limited thereto.

Figure 4:
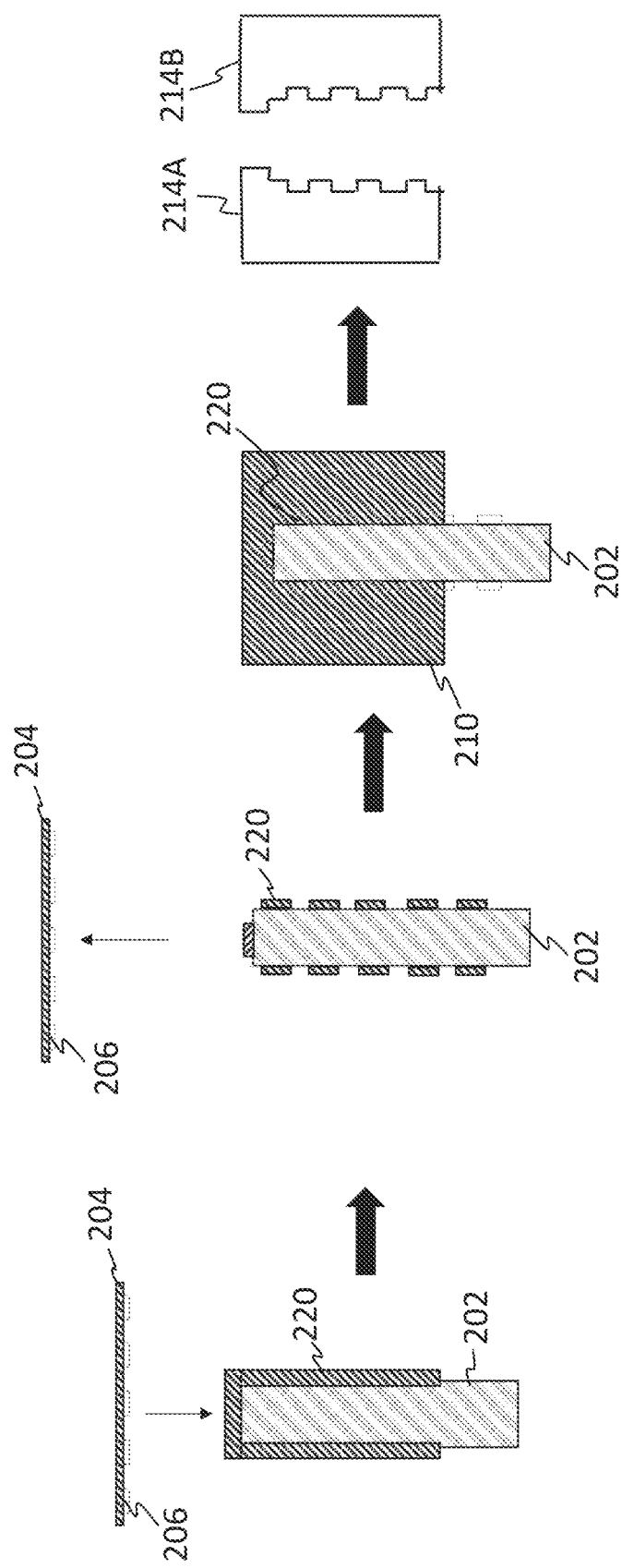
FIG. 4 is a depiction of another process for texturing a material using a membrane.

FIG. 4 depicts another method of manufacturing the textured mandrel. In this method, a UV curable coating 220 is applied to a mandrel 202. Following the application of the UV coating, the procedure detailed above in the FIG. 3 is followed. For example, the mandrel 202 is contacted with a membrane 204 having a texture 206 on one of its surfaces. The mandrel may be heated during the contact with the membrane 204. The membrane 204 may be vacuum formed on the mandrel 202. When the membrane 204 is removed from the mandrel 202, an image of the texture 206 is formed on the coating 220 disposed on the outside of the mandrel 202. The image of the texture 206, before or after removing the membrane 204, may be subjected to radiation (e.g., UV radiation, infrared radiation, electron beam radiation, microwave radiation, or a combination thereof) to cure and harden it. Alternatively, it can be placed in an oven and subjected to an elevated temperatures to cure and harden it.

The mandrel 202 may then be placed in a die and a casting material (e.g., a metal, a ceramic or a polymer) disposed on the mandrel to form a mold 210. The mold 214A and 214B is then removed from the mandrel 202 and may be used to manufacture other articles. The articles will have the texture inscribed on the surface.

In an embodiment, the textured surface of the mandrel may be treated with a mold release agent to facilitate removal of the mandrel 202 from the mold 210. This can be done by spraying the surface of the mold 210 prior to the molding process or alternatively, the surface of the mandrel that is to be molded can be sprayed or coated with the mold release agent prior to the molding.

The mold release agent is preferably a soap. Examples are stearic acid, calcium stearate, sodium stearate, potassium stearate, or a combination thereof.

Molding of Glove

In some embodiments, the mandrel 202 depicted in the FIGS. 3 and 4 are shaped in the form of a human hand. The membrane 204 imparts a texture to the surface of the hand-shaped mandrel. After solidifying, the mandrel 202 may be used to texture other thin membranes that are vacuum formed on the surface of the textured mandrel. The thin membrane is now in the shape of a glove (or in the shape of the mandrel), with its inner surface being textured with the aforementioned texture. The glove may then be removed from the surface of the mandrel and turned inside-out for use in nursing operations, cleaning operations, and the like. In an aspect, the outer surface of the glove can also have the texture, for example, by turning the glove inside-out and repeating the aforementioned texture forming procedure. The texture of the outer surface can be the same or different from the texture of the inner surface, by using a mandrel having a different texture.

In some embodiments, a coating (e.g., the curable coating, such as the UV curable coating) is applied on the mandrel 202 (e.g., glove shaped mandrel, or glove shaped mold), to form textures on the surface of the coating. The resulting glove shaped mandrel comprises the coating, wherein the coating comprises textures, for example, micro-texture structures on the surface of the coating. The glove shaped mandrel may comprise ceramics, ABS, nylon, or a combination thereof. Coating materials such as acrylic resin, epoxy resin, polyurethane resin, or a combination thereof, may be used to form the coating.

The micro-texture structure may be uniformly or non-uniformly distributed on all or part of the surface of the coating. The micro-texture structure may comprise several characteristic structures that protrude or recess from the surface of the coating, and the dimensions of the several characteristic structures in the X and Y directions are not greater than 10 micrometers (μm), for example, 0.1 to 10 μm, 1 to 8 μm, or 3 to 6 μm, and the dimensions in the Z direction are not greater than 30 μm, for example, 0.1 to 30 μm, 1 to 20 μm, or 5 to 10 μm. The Z direction herein refers to the direction wherein the structures protrude or recess from the surface of the coating, and X and Y directions refers to the directions within the plane perpendicular to the Z direction. In an aspect, the dimensions of the structures herein may refer to a measurable extent of, such as length, breadth, depth, or height.

Figure 5:
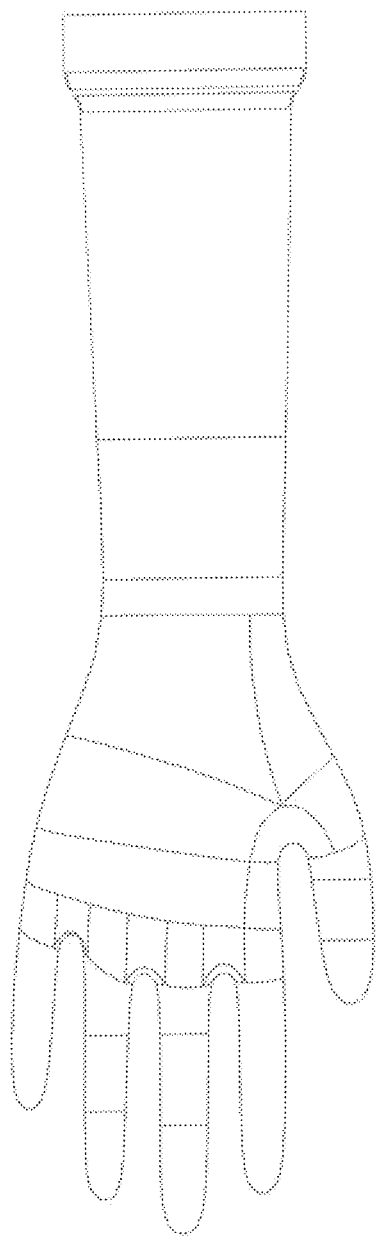
FIG. 5 is a depiction of a glove hand mold having a micro-textured structure according to an embodiment.
Figure 6:
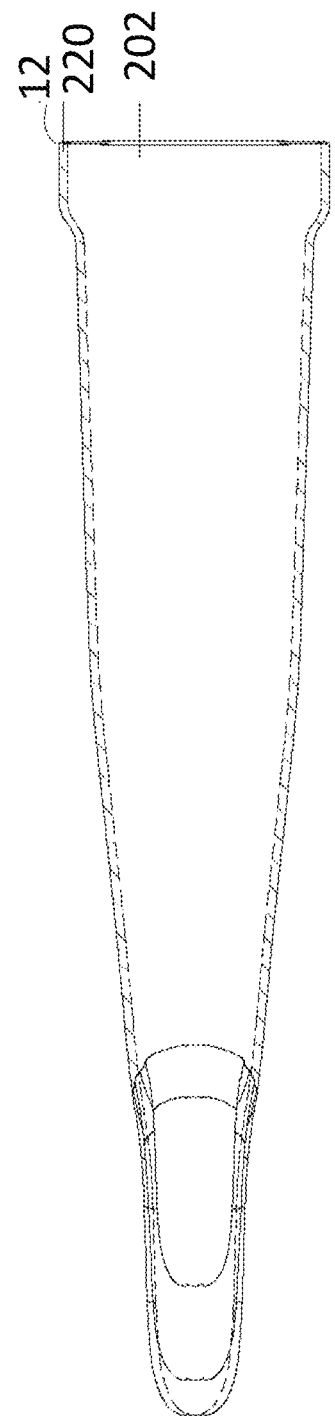
FIG. 6 is a depiction of a partially enlarged cross-sectional structure of a glove hand mold having a micro-textured structure according to an embodiment.

According to an aspect, a glove shaped mold having a micro-textured structure is provided. As shown in FIGS. 5 and 6, the glove shaped mold includes a glove shaped mandrel 202, the surface of the glove shaped mandrel 202 has a coating 220, and several micro-texture structures 12 are formed on the surface of the coating 220. It is evenly or unevenly distributed on the whole or part of the surface of the coating 220.

Figure 7:
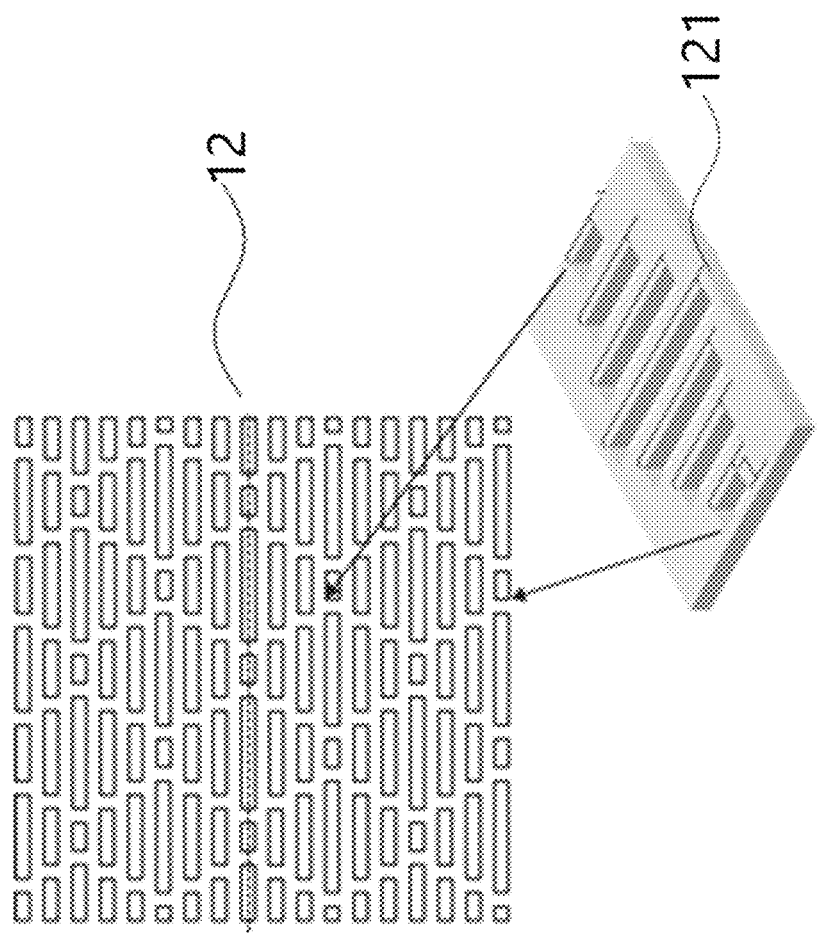
FIG. 7 is a depiction of an enlarged view of the details of the micro-texture structure according to an embodiment.

As shown in FIG. 7, the micro-texture structure 12 includes several characteristic structures 121 protruding or recessed on the surface of the coating 220, and the dimensions of the several characteristic structures 121 in the X and Y directions are generally not larger than 10 μm, and not larger than 30 μm in the Z direction. The size of the characteristic structure 121 can be represented by L*W*H (wherein, L is the characteristic length, W is the characteristic width and H is the characteristic height/depth), and the distance between adjacent characteristic structures 121 is not greater than 100 μm. The micro-texture structure 12 can also adopt other microstructures, which are not specifically limited. In addition, while having the above-mentioned microscopic texture, frosted texture or other macroscopic textures commonly used in existing hand models can also be used, so as to obtain a glove hand model with a combination of macro and micro textures.

An aspect of a method for manufacturing the glove shaped mandrel comprising micro-texture structures comprises the following steps. Step a) The coating is applied to the mandrel, for example, by spraying a paint comprising the coating materials. Step b) The coated mandrel may be subjected to heat treating to form an initially finalized coating. Step c) The membrane 204 comprising a desired micro-texture structure is disposed on the surface of the coating of the glove shaped mandrel of step b), then form a micro-texture structure of the surface of the coating by e.g., vacuum forming (e.g., vacuum adsorption) or external positive pressure pressing, and curing the coated mandrel to manufacture a cured coated mandrel. Step d) The membrane 204 is removed from the cured coated mandrel to manufacture the glove shaped mandrel comprising micro-texture structures on the surface.

The spraying of the paint comprising the coating materials of step a) may comprise using a spray gun to spray paint comprising the coating materials. The spraying may be performed with an air pressure of 50 pounds per square inch (psi) to 70 psi, 53 psi to 67 psi, or 55 psi to 65 psi. A distance from the surface of the glove shaped mandrel may be 5 centimeters (cm) to 50 cm, 10 cm to 40 cm, or 15 cm to 40 cm, at a constant speed for 1 spray. A thickness of the coating may be 15 μm to 200 μm, 30 μm to 150 μm, or 50 μm to 100 μm.

The heat treating in step b) may comprise heating at 60 to 90° C., 65 to 85° C., or to 80° C. The heat treating time may be 30 seconds to 5 minutes (min), 1 min to 4 mins, or 2 min to 3 mins.

In step c), the pressure of vacuum forming or external positive pressure pressing may be 1 to 5 standard atmospheric pressure (atm), 1.5 to 4 atm, or 2 to 3 atm. Curing the coated mandrel includes heating or UV curing. The heating includes heating at 60 to 90° C., for example, 60 to 90° C., 65 to 85° C., or 70 to 80° C., for 3 mins to 10 mins, for example, 4 mins to 9 mins, or 5 mins to 8 mins. The UV curing process may comprise using a UV lamp with an energy of 100-500 milliJoules (mJ), 150-450 mJ, or 150-450 mJ, to cure the coating. One of the problems encountered in the manufacturing of gloves (having textured surfaces) is the presence of air bubbles that are trapped in the resin used to manufacture the glove. The presence of air bubbles promotes the resin to seal the micro-channels in the pattern thus destroying the texture. Once sealed the air's only route of escape is along the seamlines down to the base of the hand. It is noted that excess resin as well as air bubbles traveled along the seam lines. In addition, pools of resin were trapped in the gaps between the fingers. The film is likely to tear easily along these seam lines when the film was stretched.

The larger air bubbles could be pressurized to move to the seamlines. A Kimtech wipe was used to help propagate the vacuum from the hand to the edge. Extra resins in-between the seamlines were later removed/de-flashed (an intensive process that removed nearby resin).

The resin used for forming the glove may include nitrile (e.g., nitrile butadiene rubber), latex (e.g., natural rubber latex), polyvinyl chloride (PVC), polycyclooctadiene (PCT), polyethylene terephthalate (PET), chlorinated polyethylene (CPE), thermoplastic elastomer (TPE), polyethylene (PE), or a combination thereof, but is not limited thereto. The resin used for forming the glove in an embodiment may comprise a polymeric resin that can be crosslinked. A preferred polymeric resin is a polysiloxane resin that can be UV cured or cured using thermal radiation. The polysiloxane resin contains vinyl groups that facilitate crosslinking. The polysiloxane resin has a viscosity of 10,000 to 40,000 centipoise prior to the crosslinking. The mandrel (a replica of a hand with a textured surface) is immersed in the resin. Bubbles formed between the mandrel and the resin may then be removed by using a pressure or a vacuum. The resin is then subjected to curing to form a glove with a textured surface. After curing, the glove is removed from the mandrel and packaged for sale.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A method of manufacturing a mold, the method comprising:
   disposing a membrane having a textured surface on a mandrel,
   wherein the mandrel has a shape of a human hand, and wherein the membrane has a thickness of 500 nanometers to 50 micrometers;
   pressing the membrane onto the mandrel to cover a surface of the mandrel to impart the texture of the membrane to the mandrel; and
   separating the membrane from the mandrel to manufacture the mold.

2. The method of claim 1, the method further comprising disposing a coating on a surface of the mandrel, before disposing the membrane having the textured surface on the mandrel.

3. The method of claim 2, wherein the disposing the coating and disposing the membrane comprises
   spraying a paint comprising coating materials to dispose the coating,
   further heat treating the coated mandrel,
   disposing a membrane on the surface of the coating of the coated mandrel, wherein the membrane comprises a micro-texture structure, and
   further curing the coated mandrel to manufacture a cured coated mandrel.

4. The method of claim 1, wherein the pressing the membrane onto the support comprises vacuum forming, or external positive pressure pressing.

5. The method of claim 3, wherein the spraying the paint comprises spraying with an air pressure of 50 psi to 70 psi, and a distance from the surface of the mandrel is 5 centimeters to 50 centimeters, at a constant speed for 1 spray.

6. The method of claim 2, wherein the coating comprises epoxy resin, acrylic resin, polyurethane resin, or a combination thereof, and a thickness of the coating is 15 micrometers to 200 micrometers.

7. The method of claim 3, wherein the heat treating comprises heating at 60 to 90° C., for 30 seconds to 5 minutes.

8. The method of claim 3, wherein the curing comprises heating or UV curing, wherein the heating comprises heating at 60 to 90° C. for 3 minutes to 10 minutes, wherein the UV curing comprises using a UV lamp with an energy of 100-500 millijoules to cure the coating.

9. The method of claim 4, wherein a pressure of the vacuum forming or the external positive pressure pressing is 1 to 5 standard atmospheric pressure.

10. The method of claim 3, wherein the micro-texture structure comprises a structure that protrude or recess from a surface of the coating, and dimensions of the structures in the X and Y directions are not greater than 10 micrometers, and dimensions of the structures in the Z direction are not greater than 30 micrometers.

11. The method of claim 1, wherein the membrane has opposing surfaces at least one of which is textured, and comprises a polysiloxane, an epoxy, an acrylate, or a combination thereof, and wherein the mold comprises ceramics, acrylonitrile butadiene styrene, nylon, or a combination thereof.

12. A mold in a shape of a human hand and comprising a textured surface, wherein the mold is manufactured by the method of claim 1.

13. The mold of claim 12, further comprising a coating on a surface of the mold, wherein the coating comprises at least one micro-texture structures.

14. The mold of claim 13, wherein
   the mold comprises ceramics, acrylonitrile butadiene styrene, nylon, or a combination thereof,
   the coating comprises coating materials comprising acrylic resin, epoxy resin, polyurethane resin, or a combination thereof, or both.

15. The mold of claim 13, wherein the micro-texture structure is uniformly distributed on at least a part of the surface of the coating.

16. The mold of claim 13, wherein the micro-texture structure is non-uniformly distributed on at least a part of the surface of the coating.

17. The mold of claim 13, wherein the micro-texture structure comprises a structure that protrude or recess from a surface of the coating, and dimensions of the structures in the X and Y directions are not greater than 10 micrometers, and dimensions of the structures in the Z direction are not greater than 30 micrometers.

18. A method of manufacturing an article, the method comprising:
   contacting a first mandrel with a first mold, wherein the first mold has a textured surface;

texturing a surface of the first mandrel with the first mold;
disposing the first mandrel in a die;
disposing a first material in the die to contact the first mandrel;
imparting a texture from the surface of the first mandrel onto the material to form a second mold;
disposing a texture from the second mold onto a second material; where the second material is different from the first material to manufacture the article, and where the first mold is a membrane having a thickness of 500 nanometers to 50 micrometers, having opposing surfaces at least one of which is textured, and comprises a polysiloxane, an epoxy, an acrylate, or a combination thereof.

19. The method of claim 18, where the contacting the first mandrel with the first mold comprises using a vacuum, or external positive pressure to facilitate contact between the first mandrel and the first mold, and a negative image of the first mold is formed on the first mandrel.

20. The method of claim 18, wherein the first mandrel is a replica of a hand, and the second material is formed into a glove, wherein the second material comprises nitrile, latex, polyvinyl chloride, polycyclooctadiene, polyethylene terephthalate, chlorinated polyethylene, thermoplastic elastomer, polyethylene, or a combination thereof.

21. The method of claim 18, wherein the texture from the second mold is formed on a surface of the second material, an opposite surface of the second material, or both, and when the texture is formed on both surfaces of the second material, surfaces can have the same or different textures from each other.

* * * * *